Sept. 8, 1964  G. C. SUMMERS  3,148,352
ACOUSTIC VELOCITY BORE HOLE LOGGING SYSTEMS AND APPARATUS
Filed June 8, 1959
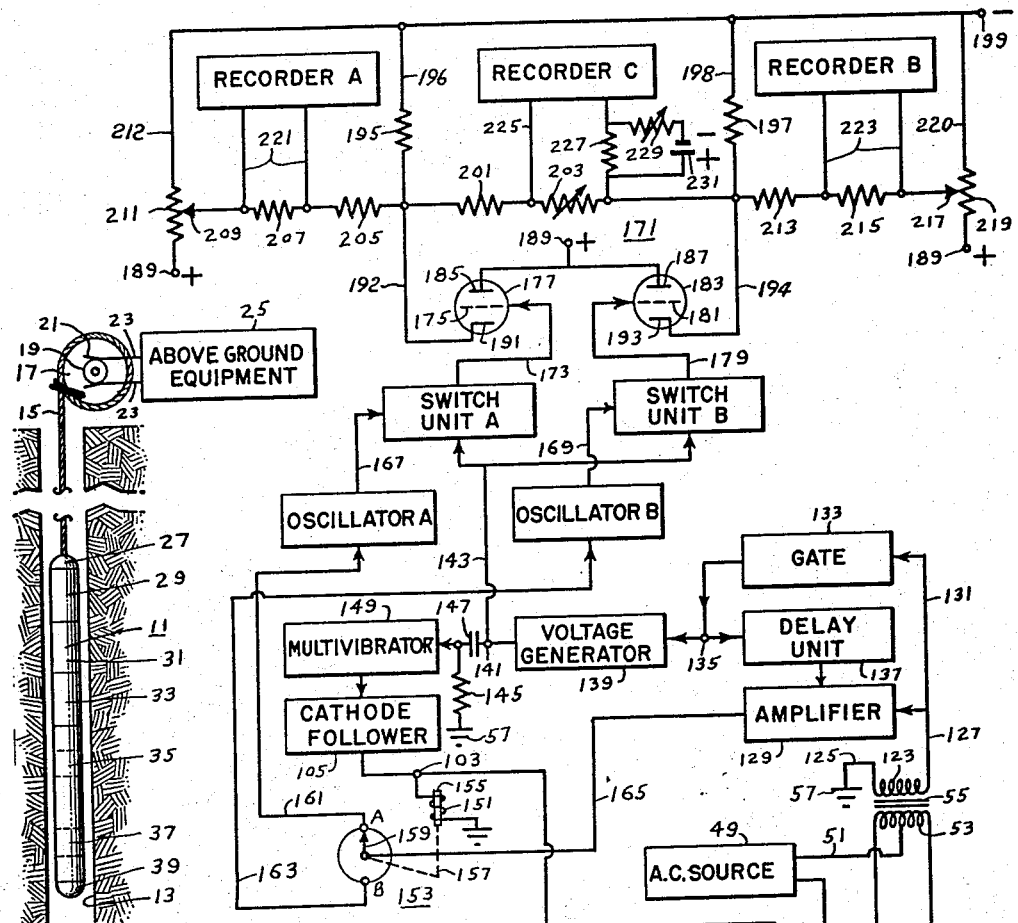
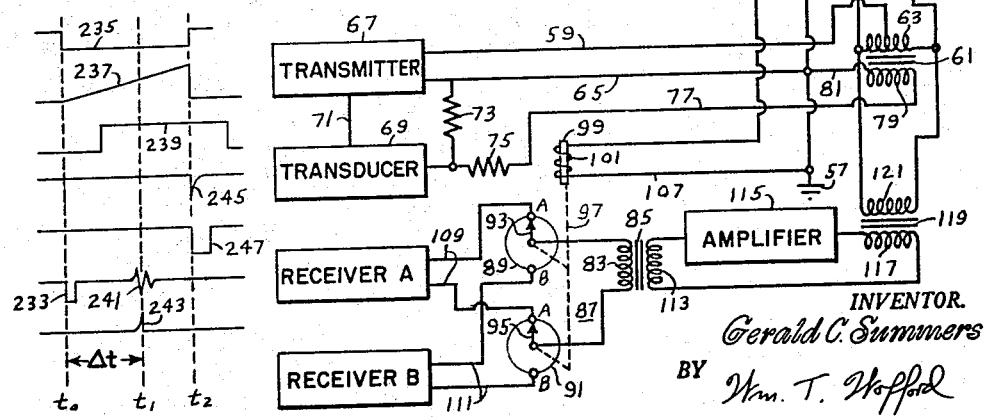
Fig. 1   Fig. 2
Fig. 3
INVENTOR.
Gerald C. Summers
BY Wm. T. Wofford
Attorney

United States Patent Office 3,148,352
Patented Sept. 8, 1964

3,148,352
ACOUSTIC VELOCITY BORE HOLE LOGGING
SYSTEMS AND APPARATUS
Gerald C. Summers, Dallas, Tex., assignor, by mesne assignments, to PGAC Development Company, Houston, Tex., a corporation of Texas
Filed June 8, 1959, Ser. No. 818,721
11 Claims. (Cl. 340—18)

My invention relates to improved systems and apparatus for measurement and logging of velocity of compressional wave energy in earth formations, and particularly to the measurement of the velocity of elastic impulses or waves through formations adjacent the walls of a bore hole.

In the velocity logging art, a log which measures a time interval between transmission of a pulse and receipt of first energy at a receiver, is called a single receiver log. A log which measures the time interval between the arrival of first energy at one receiver and the arrival of first energy at a second receiver for the same transmitter impulse is called a dual receiver log. The path of first received energy from the transmitter to a receiver includes the drilling mud in the bore hole between the transmitting transducer and the point of the exit from the formation and the receiver. In making a single receiver log, a certain fixed time factor which represents the average time for mud travel is used to compensate the log to get formation acoustic velocity. This compensating time factor is however based upon the assumption that the down-hole instrument is always centered in the bore hole, but unfortunately as a practical matter, such is not the case. As a result, the single receiver log is subject to error. Although two simultaneous single receiver logs will yield more reliable information than one, each log is subject to mud travel time error.

In making a dual receiver log a parameter representing the time interval between a transmitted pulse and first energy arrival at the receiver nearest the transmitter is subtracted from a parameter representing the time interval between a transmitted pulse and first energy arrival at the receiver farther from the transmitter, to obtain a difference parameter which represents the time interval between the arrival of first energy at the near receiver and arrival of first energy at the far receiver. Since total mud travel time in the transit of first energy arrival at the near receiver is normally the same as that in the case of first energy arrival at the far receiver, the mud travel time cancels out in the subtraction process. Unfortunately, however, in cases where there is a sharp change in bore hole diameter, such as a cavity adjacent one receiver when there is no cavity adjacent the other receiver, then the mud travel times do not in fact cancel out, with the result that an error is introduced into the dual receiver log. Since both single receiver and dual receiver logs have their advantages and disadvantages, and since the disadvantages are not coincident, it would be highly desirable to devise an effective velocity logging system apparatus which would simultaneously produce a single receiver and a dual receiver log.

It is accordingly an object of my invention to provide an effective velocity logging system for simultaneously producing a single receiver and a dual receiver log.

It is another object of my invention to provide a velocity logging system which shall be capable of producing simultaneous single receiver and dual receiver logs without undue complexity of system and apparatus.

Another object of my invention is to provide a simple and effective circuit arrangement for deriving signals for application to single receiver and dual receiver recording devices.

These and other objects are effected by my invention as will be apparent from the following description, taken in accordance with the accompanying drawings, forming a part of this application, in which:

FIG. 1 is a diagrammatic showing of a general layout of a bore hole logging system in which my invention may be utilized;

FIG. 2 is a schematic circuit diagram showing a velocity logging system in accordance with a preferred embodiment of my invention; and FIG. 3 is a graph showing a plurality of waveforms to aid in explanation of my invention.

Referring now to the drawings, there is shown in FIG. 1 a logging instrument assembly 11 lowered into a bore hole 13 by means of a cable 15 which is reeled off a conventional cable drum 17 which is powered and controlled by conventional means (not shown). The cable 15 in addition to supporting the instrument assembly 11, has a plurality of conductors, insulated from each other and from the outer sheath. The cable drum shaft is provided with a plurality of slip rings 19, with associated brushes 21, through which electric signals are transmitted to or from the cable conductors and via suitable conductors 23 to components of above ground equipment, indicated generally by the block 25. The sections of the down-hole instrument assembly as shown by FIG. 1 may include, by way of illustration, reading from top to bottom, a cable head 27, an amplifier and control section 29, an acoustic energy transmitter 31, a transmitter transducer 33, an acoustic receiver section including two receivers 35, 37, and a nose piece 39. The components of the down-hole instrument assembly are each built into a length of heavy pipe provided with threaded coupling devices at its end, as well as suitable electric connector devices. The cable 15 is fixed at its lower end to the cable head 27 which is coupled at its lower end to the uppermost instrument component 29.

In FIG. 2 there is shown a velocity logging system embodying the principles of my invention and in which two single receiver logs and one dual receiver log are obtained. The instrument assembly (down-hole equipment) is connected via a conventional three-conductor plus armor cable, the conductors being hereinafter referred to as the first, second and third conductors 41, 43, 45, and the armor as the return conductor 47.

Power is supplied from a conventional alternating current source 49 above ground via one lead 51 connected to the balanced center tap of the secondary winding 53 of a first transformer 55, the free ends of the secondary winding being connected respectively to the first and second cable conductors 41, 43. The other lead for the power source 49 is connected through the return conductor 47 to ground at 57. Power is taken off down-hole via one transmitter input lead 59 which is connected to the balanced center tap of the secondary winding 63 of a second transformer 61, the free ends of the secondary winding 63 being connected respectively to the first and second cable conductors 41, 43, and the other transmitter input lead 65 being connected to the cable return conductor 45. Thus, power is supplied down-hole by a phantoming arrangement which is well known in the art, the first and second cable conductors 41, 43 being effectively in parallel for the power frequency.

The transmitter 67 may be a conventional type free-running high power pulse source such as described in U.S. Patent 2,737,639. Application of power causes the transmitter 67 to emit pulses at a suitable repetition rate, for example, in the range of 15 to 30 pulses per second. These pulses drive a transducer 69 which is connected to the transmitter 67 via output lead 71, thus generating a train of acoustic, or elastic impulses which are coupled by the drilling fluid to the formations adjacent the bore hole 13. The transducer 69 may be of a conventional type, such as described in U.S. Patent 2,722,282. A small portion of the voltage pulse from the transmitter 67 is developed across a first resistor 73 which is connected in series with lead 65 to the return conductor 47. This voltage is applied through a series resistor 75 via lead 77 to one terminal of the primary winding 79 of the second transformer 61, the other terminal being connected via lead 81 to the return conductor 47 which is grounded at 57. This small voltage, hereinafter called the synchronizing pulse, is sent up to the above ground equipment, balanced by the second transformer 61, via the first and second cable conductors 41, 43.

As hereinbefore mentioned, the down-hole instrument in the system of FIG. 2 carries two receivers, hereinafter referred to respectively as receivers A and B. The receivers A and B may be of identical conventional types which function to convert impinging acoustic energy into electric signal form. The receiver outputs are connected in sequence to the primary winding 83 of a first isolation transformer 85 by means of a first solenoid operated stepping switch 87. The stepping switch 87 as shown by FIG. 2 has two sets 89, 91 of fixed contacts with two contacts designated A and B located 180° apart in each set. There is a movable contact 93, 95 associated with each set 89, 91, which sweeps the respective fixed contacts A and B in sequential succession. The movable contacts 93, 95 are actuated by means of a mechanical linkage 97 and ratchet mechanism (not shown) which is connected to the solenoid armature 99. The movable contacts 93, 95 move one step each time the solenoid is actuated. The coil 101 of the solenoid is connected on one side to the third cable conductor 45, which is in turn connected at the above ground end to the output terminal 103 of a cathode follower 105. The other side of the solenoid coil 101 is connected via the lead 107 to ground 57. Receiver A has its output leads 109 connected to contacts A of the stepping switch 87, and receiver B has its output leads 111 connected to contacts B of the stepping switch 87. The secondary winding 113 of the first isolation transformer 85 is connected in series with an amplifier 115 and the primary winding 117 of a second isolation transformer 119, the secondary winding 121 of which is connected across the first and second cable conductors 41, 43.

The primary winding 123 of the first transformer 55 has one side connected to ground 57 via lead 125 and the other side is connected via lead 127 to the input of a second amplifier 129, and also via lead 131 to the input of a gate 133. The transmitter synchronizing pulse is utilized to trigger the gate 133, which may be of a conventional type such as that described in my Patent Re. 24,446. The output terminal 135 of the gate 133 is connected to a delay unit 137, and to a voltage generator 139. The output of the delay unit 137 is connected to the second, or above ground amplifier 129. The delay unit 137 may be of a conventional type which functions to delay application of the gate output to turn on the second amplifier 129 until after the synchronizing pulse has passed, thus insuring that the second amplifier output will contain no component of the synchronizing pulse. The voltage generator output terminal 141 is connected to the respective inputs of switch units A and B via lead 143. The voltage generator 139 may be of a type which is capable of generating a precision sawtooth waveform, such as the voltage generator described in U.S. Patent Re. 24,446. The switch units A and B may each be like the one described in Re. 24,446 and designated generally therein by reference numeral 32, as will be hereinafter more fully explained. The voltage generator output terminal 141 is also connected through a differentiating network comprising a resistor 145 and capacitor 147 to the input of a monostable multivibrator 149. The differentiating network 145, 147 functions to generate a sharp negative pulse at the end of the rise time of each voltage generator output waveform, which pulse serves to trigger the multivibrator 149. The multivibrator 149 may be identical in form to the gate 133, although its unstable time interval may be different. The multivibrator output is connected to the input of the conventional cathode follower 105 hereinbefore mentioned. The cathode follower output terminal 103 is also connected in series with the coil 151 of the solenoid of a second stepping switch 153, to ground 57. The second stepping switch 153 is of the same type as the first stepping switch 87 hereinbefore described, except that it has only one set of contacts. The solenoid armature 155 is connected via a mechanical linkage 157 to the stepping switch movable contact 159. The stepping switch 87 has two fixed contacts 180° apart, and these are herein designated respectively as contacts A and B. The movable contact 159 sweeps the fixed contacts A and B in sequential succession, moving one step each time the solenoid is actuated. The fixed contact A is connected via a lead 161 to the input of an oscillator A, and fixed contact B is connected via a lead 163 to the input of an oscillator B. The movable contact 159 is connected via lead 165 to the output of the second amplifier 129. Thus the contacts of the second stepping switch 153 are utilized to apply the output of the second amplifier 129 successively to the respective oscillators A and B. These oscillators are actually of the type known in the art as blocking oscillators, and may be each like the blocking oscillator described by Re. 24,446 and designated by reference numeral 31 therein. The outputs of oscillators A and B are connected respectively via leads 167, 169 to respective switch units A and B. The oscillator outputs function to control the switch units, as will be hereinafter more fully explained. The respective outputs of the switch units A and B as will be hereinafter more fully explained, are direct current voltages which have magnitude proportional to the time interval between a transmitted pulse and the first arrival of corresponding acoustic energy at the respective receiver.

The switch unit outputs are connected to the inputs of a circuit arrangement which provides convenient and effective inputs for recording devices to simultaneously record two single receiver logs and a dual receiver log. This circuit arrangement is indicated generally in FIG. 2 by reference numeral 171. More specifically, the output of switch unit A is connected via lead 173 to the grid 175 of a first triode 177, and the output of switch unit B is connected via lead 179 to the grid 181 of a second triode 183. The triode plates 185, 187 are connected together and to the positive terminal 189 of a power supply (not shown). The cathodes 191, 193 of the triodes 177, 183 are connected via respective conductors 192, 194 to respective second and third resistors 195, 197 which in turn are connected via conductors 196, 198 to the negative terminal 199 of the power supply (not shown). The cathode 191 of the first triode 177 is also connected in series with a fourth resistor 201 and the first variable resistor 203 to the cathode 193 of the second triode 183. The cathode 191 of the first triode 177 is also connected in series with fifth and sixth resistors 205, 207 to the slider contact 209 of a first potentiometer 211 which has its fixed terminals connected between the positive and negative terminals 189, 199 of the power supply (not shown). The cathode 193 of the second triode 183 is also connected in series with seventh and eighth resistors 213, 215 to the slider contact 217 of a second potentiometer 219 which has its fixed terminals connected between the positive and negative terminals 189, 199 of the power supply (not shown). The pertinent fixed terminals of potentiometers 211 and 219 are returned to negative power supply terminal 199 via respective conductors 212, 220.

A recorder A has its input terminals connected via leads 221 across the sixth resistor 207, while a recorder B has its input terminals connected via leads 223 across the eighth resistor 215. The recorder C has one input terminal connected via lead 225 to the junction of the fourth resistor 201 and the first variable resistor 203, and its other input terminal connected in series with a ninth resistor 227 to the cathode 193 of the second triode 183. The ninth resistor 227 is shunted by a second variable resistor 229 in series with a voltage source shown as a battery 231 having its positive terminal connected to the cathode 193 of the second triode 183. The recorders A, B, and C may be of conventional types, for example, potentiometer type strip chart recorders.

In operation of the acoustic logging system shown by FIG. 2, each time the transmitter 67 fires, an acoustic impulse is put out by the transducer 69. At the same time, a small portion of the transmitter pulse energy is taken as a synchronizing pulse which is developed across resistor 73 and transmitted to above ground via the first and second cable conductors 41, 43, and taken off at the primary winding 123 of the first transformer 55 and is fed via conductor 131 to the gate 133. The synchronizing pulse 233 is shown in FIG. 3 at time $t_0$, which is the time at which it arrives at the gate 133. The gate 133 is a mono-stable multivibrator, the output of which is indicated at 235 in FIG. 3, beginning at time $t_0$ and extending to time $t_2$. The gate output serves two functions. It acts to turn on the voltage generator 139, and the second amplifier 129. Thus at time $t_0$, the voltage generator 139 begins to generate its precision sawtooth waveform, indicated at 237 in FIG. 3. The gate output is applied to the second amplifier 129 through the delay unit 137, which acts to turn the amplifier 129 on only after sufficient time has elapsed for passage of the synchronizing pulse 233, so that the amplifier is blocked insofar as the synchronizing pulse is concerned. The amplifier gate waveform is indicated at 239 in FIG. 3.

The acoustic energy which leaves the transmitting transducer 69 will travel in many modes through the drilling fluid and the formations adjacent the bore hole, and portions of it will arrive at receivers A and B, with the arrival time in each case depending upon the specific mode, the nature of the medium through which it travels, and the spacing of the respective receiver from the transmitting transducer. The velocity of sound in earth formations ranges from about 5,000 to 30,000 feet per second, or at the rate of 200 to 33.3 microseconds per foot of travel distance. Since sound will travel faster in the earth formations than in the drilling fluid, first arrival energy at each receiver will always be from the formation. Acoustic energy arriving at each receiver persists over a period of many microsecconds, but only the first arrival of acoustic energy at each receiver is of interest in the velocity logging systems disclosed herein. In the instant case, the acoustic energy from a given transmitted impulse will arrive first at receiver A, since it is closest to the transmitting transducer. Energy arriving at receiver A will be transmitted through contacts A of the first stepping switch via the first amplifier 115 and the first and second cable conductors 41, 43 to above ground, where it is taken from the primary winding 123 of the first transformer 55 via lead 127 to the input of the second amplifier 129. The received signals do not affect the gate 133, since it has already been triggered. The received signal will be passed by the amplifier 129 because it arrives at the amplifier after it has been turned on by the delay unit 137. The receiver energy which arrives at the second amplifier 129 is indicated at 241 in FIG. 3. The second amplifier output terminals are connected via lead 165 and through contact A of the second stepping switch 153, and via lead 161 to oscillator A. As hereinbefore stated, oscillator A is a blocking oscillator which functions upon application of an input signal to generate a sharp output pulse. This output pulse is indicated at 243 in FIG. 3. It should be noticed that oscillator A functions immediately upon arrival of a signal, and so produces its output pulse 243 at time $t_1$ (see FIG. 3) which represents arrival of first received energy from receiver A. The output pulse from oscillator A is connected via lead 167 to the control input of switch unit A. As hereinbefore mentioned, reference is made to the switch unit designated by the reference numeral 32 in my patent Re. 24,446 for a detailed explanation of a suitable switch unit. It will suffice here to say that the output of switch unit A is a direct current voltage of magnitude dependent upon the magnitude of the voltage generator output (degree of rise of the sawtooth waveform) at the instant of application of the output pulse of the oscillator A, which is time $t_1$ in FIG. 3. The magnitude of the switch unit output is adjusted each time it receives a control pulse 243. Thus the output voltage of switch unit A is proportional to the difference between time $t_1$ and time $t_0$, or delta $t$ of FIG. 3. This is to say that the output of switch unit A is a measure of the time interval between the transmission of an acoustic energy impulse from the transmitting transducer and the receipt of first acoustic energy from that impulse at receiver A (when corrected for the travel time of the synchronizing pulse from the transmitter 67 to the gate 133). During the time interval between successive control signals, the output of switch unit A remains constant.

Now at the end of the rise time of the precision sawtooth waveform 237 generated by the voltage generator 139 (the time at which the waveform returns suddenly from peak magnitude to initial magnitude), which is time $t_2$ in FIG. 3, due to the rapid rate of change of magnitude of the sawtooth waveform, the differentiating network 145, 147, will produce a sharp negative pulse. This negative pulse, indicated at 245 in FIG. 3, triggers the multivibrator 149, causing the multivibrator to generate its output pulse which is indicated at 247 in FIG. 3. The multivibrator output pulse 247 is fed through the cathode follower 105 to cause energization of the solenoid coils 101, 151 of the stepping switches 87, 153 so that their movable contacts 93, 95, 159 close on contacts B. The system is now ready for a second synchronizing pulse 233, which is produced by the next firing of the transmitter 67, at which time the system will respond as before, except that it will operate on the acoustic energy arriving at receiver B. At the time corresponding to $t_2$, the stepping switches 87, 153 will be actuated again, making the system ready for the third synchronizing pulse. One cycle of system operation is thus completed. It is apparent that the system will sample the output of a given receiver once for every two acoustic impulses that are transmitted. Each time a given receiver output is sampled, the corresponding switch unit will adjust its output to correspond with the new value of delta $t$.

The output of switch unit A, which is a voltage proportional to delta $t$ for receiver A, is applied to the grid 175 of the first triode 177, while the output of switch unit B, which is a voltage proportional to delta $t$ for receiver B, is applied to the grid 181 of the second triode 183. The triodes 177, 183 operate as cathode followers, the second and third resistors 195, 197 being relatively large and respectively return via conductors 196, 198 to a negative power supply terminal 199. Both switch unit output voltages are positive, and large compared to the voltage required to drive the respective recorder. Thus at the cathodes 191, 193 of the triodes 177, 183, voltages appear which are shifted a few volts positive in relation to their causative voltages (switch unit outputs) but are still linearly proportional to same. The fourth resistor 201, which is connected in series with the first variable resistor 203 between the cathodes is large compared to the output impedance of the triodes and thus a voltage change at one cathode does not cause a voltage change at the other cathode. The first variable resistor 203 is small compared to the fourth resistor 201. Thus, the current which flows in the fourth resistor 201 and hence in the first variable resistor 203 is linearly proportional to the difference in potential between the cathodes 191, 193 and consequently also between the grid inputs (switch unit outputs). The voltage across the first variable resistor 203 is fed to recorder C, to produce a true dual receiver log in all cases where the respective grid input voltages represent a respective delta $t$ for respective ones of two receivers spaced the same direction from the transmitter (delta *t* for each respective receiver being defined as the interval of time between transmission of an acoustic energy impulse and the receipt of first acoustic energy from that impulse by a respective receiver).

The fifth and seventh resistors 205, 213 are also large compared to the output impedances of the triodes 177, 183, while the sixth and eighth resistors 207, 215 are quite small compared to the fifth and seventh resistors. Thus the voltage appearing across the sixth and eighth resistors 207, 215 are of magnitude suitable for inputs to recorders, and these voltages are proportional to delta *t* respectively for receivers A and B and thus recorders A and B will each produce a true single receiver log for the respective receiver. The purpose of the first and second potentiometers 211, 219 is to calibrate the respective recorder. That is, to produce a voltage equal to the cathode voltage for the lowest velocity to be recorded, so that the recorder pen will be at the low end of the scale for that velocity and will move up scale as the velocity increases. In this regard it should be noted that the magnitude of the switch unit outputs decrease as velocity increases, and recorder polarity should be chosen accordingly. The purpose of the variable voltage source made up of the battery 231 and second variable resistor 229 is to produce calibrating voltage for the dual log recorder C. The battery is used since this voltage must be free of ground. The sixth and eighth resistors 207, 215 and the first variable resistor 203 connected across respective recorder inputs may be varied to change the sensitivity of the respective recorder. By way of example, typical values of the fourth, fifth and seventh resistors 201, 205, 213 may be 80K with a cathode voltage of approximately 120 volts for a velocity of 5,000 feet per second, with the cathode voltage decreasing to approximately 40 volts for a velocity of 30,000 feet per second. The sixth and eighth resistors 207, 215 and the first variable resistor 203 may have values in the range of approximately 100 to 300 ohms depending upon receiver spacing. The triode plate supply may be 270 volts positive, and the cathode resistors may be returned to 75 volts negative.

It should be apparent from the foregoing that I have provided an effective velocity logging system which is capable of producing simultaneous single and dual receiver logs, and that this is accomplished without introducing undue complexity into the logging system or apparatus. It should be further apparent that I have provided a simple and effective circuit arrangement for simultaneously producing single and dual receiver logs.

While I have shown my invention in only one form, it will be obvious to those skilled in the art that it is not so limited, but is susceptible of various changes and modifications without departing from the spirit thereof. For example, it may be possible to provide an additional receiver, together with additional associated components, to produce more simultaneous dual and single receiver logs. Also, it would be possible to use a single receiver with two alternately fired transmitters to produce similar results. The foregoing disclosure and the showings made in the drawings are, accordingly, merely illustrative of the principles of my invention, and are not to be interpreted in a limiting sense.

I claim:

1. In a system for measuring the acoustic velocity of earth formations adjacent a borehole, the combination of a downhole tool including an acoustic pulse transmitter movably positioned in said borehole for generating and transmitting to said formations a train of acoustic pulses and for concurrently generating a train of synchronizing pulses, surface equipment including a generator for producing a signal output waveform the amplitude of which varies monotonically as a function of time for a predetermined time interval, a cable having at least three inner conductors extending through the borehole and connecting the downhole tool to the surface equipment, in A.C. power supply in the surface equipment connected to said transmitter via a first of said conductors, said synchronizing pulse being applied to said surface equipment via said first conductor and a second of said conductors, means connected to said first and second conductors to receive said synchronizing pulses and for initiating generation of said waveform responsive to each said synchronizing pulse, first and second acoustic energy receivers movably positioned in said borehole and spaced different fixed distances longitudinally of the borehole from each other and from said transmitter, first and second means respectively associated with the first and second receivers and responsive to the output of said generator and each acquiring and storing a signal level which is proportional to the instantaneous magnitude of said waveform at the time of arrival at its associated receiver of first acoustic energy from an acoustic pulse, means connecting the output of said generator to both of said first and second means, switch means including a first switch unit in the surface equipment and a second switch unit in the downhole tool for connecting said first and second receiver outputs in successive sequence via said first and second conductors to said first and second means, said first and second switch units having operating coils electrically connected via a third of said conductors, means in the surface equipment responsive to termination of each said waveform for actuating both units of said switch means, a common output circuit connected to said first and second means for developing a first signal proportional to the algebraic sum of the output signal levels of said first and second means and for developing a second signal proportional to one of said output signal levels, and means connected to the common output circuit for recording as a function of the depth of the downhole tool within the borehole said first and second signals to produce simultaneously two different curves one of which represents the travel time of pulses from said transmitter to said first receiver and the other of which represents the difference between the latter travel time and that of the pulses from the transmitter to the second receiver.

2. In a system for measuring the acoustic velocity of earth formations adjacent a borehole, the combination of an acoustic pulse transmitter movably positioned in said borehole for generating and transmitting to said formations a train of acoustic pulses and for concurrently generating a train of synchronizing pulses, a generator for producing a signal output waveform the amplitude of which varies monotonically as a function of time for a predetermined time interval, means connected to receive said synchronizing pulses and for initiating generation of said waveform responsive to each said synchronizing pulse, first and second acoustic energy receivers movably positioned in said borehole and spaced different fixed distances longitudinally of the borehole from each other and from said transmitter, first and second means respectively associated with the first and second receivers and responsive to the output of said generator and each acquiring and storing a signal level which is proportional to the instantaneous magnitude of said waveform at the time of arrival at its associated receiver of first acoustic energy from an acoustic pulse, means connecting the output of said generator to both of said first and second means, means for connecting said first and second receivers to said first and second means, respectively, a common output circuit connected to said first and second means for developing a first signal proportional to the algebraic sum of the output signal levels of said first and second means and for developing a second signal proportional to one of said output signal levels, and means connected to the common output circuit for recording said first and second signals to produce simultaneously two different curves one of which represents the travel time of pulses from said transmitter to said first receiver and the other of which represents the difference between the latter travel time and that of the pulses from the transmitter to the second receiver.

3. In a system for measuring the acoustic velocity of earth formations adjacents a borehole, the combination of an acoustic pulse transmitter movably positioned in said borehole for generating and transmitting to said formations a train of acoustic pulses and for concurrently generating a train of synchronizing pulses, a generator for producing a signal output waveform the amplitude of which varies monotonically as a function of time for a predetermined time interval, means connected to receive said sychronizing pulses and for initiating generation of said waveform responsive to each said synchronizing pulse, first and second acoustic energy receivers movably positioned in said borehole and spaced different fixed distances longitudinally of the borehole from each other and from said transmitter, first and second means respectively associated with the first and second receivers and responsive to the output of said generator and each acquiring and storing a signal level which is proportional to the instantaneous magnitude of said waveform at the time of arrival at its associated receiver of first acoustic energy from an acoustic pulse, means connecting the output of said generator to both of said first and second means, switch means for connecting said first and second receiver outputs in successive sequence to said first and second means, a common output circuit connected to said first and second means for developing a first signal proportional to the algebraic sum of the output signal levels of said first and second means and for developing a second signal proportional to one of said output signal levels, and means connected to the common output circuit for recording said first and second signals to produce simultaneously two different curves one of which represents the travel time of pulses from said transmitter to said first receiver and the other of which represents the difference between the latter travel time and that of the pulses from the transmitter to the second receiver.

4. In a system for measuring the acoustic velocity of earth formations adjacent a borehole, the combination of an acoustic pulse transmitter movably positioned in said borehole for generating and transmitting to said formations a train of acoustic pulses and for concurrently generating a train of synchronizing pulses, a generator for producing a signal output waveform the amplitude of which varies monotonically as a function of time for a predetermined time interval, means connected to receive said synchronizing pulses and for initiating generation of said waveform responsive to each said synchronizing pulse, first and second acoustic energy receivers movably positioned in said borehole and spaced different fixed distances longitudinally of the borehole from each other and from said transmitter, signal producing means associated with the first receiver and responsive to the output of said generator for producing a first signal level which is proportional to the instantaneous magnitude of said waveform at the time of arrival of first acoustic energy from an acoustic pulse at said first receiver from said transmitter after traveling longitudinally along the borehole through the earth formations located between the transmitter and the first receiver, means connecting the output of said generator to said signal producing means, signal developing means responsive to the outputs of both receivers and to the synchronizing pulses for developing a second signal level proportional to the difference in travel times of the acoustic energy from the transmitter to said first and second receivers, and means connected to said signal producing means and to said signal developing means for recording said first and second signal levels to produce simultaneously two different curves one of which represents the travel time of pulses from said transmitter to said first receiver and the other of which represents the difference between the latter travel time and that of the pulses from the transmitter to the second receiver.

5. In a system for measuring the acoustic velocity of earth formations adjacent a borehole, the combination of a downhole tool including an acoustic pulse transmitter movably positioned in said borehole for generating and transmitting to said formations a train of acoustic pulses and for concurrently generating a train of synchronizing pulses, surface equipment including a generator for producing a signal output waveform the amplitude of which varies monotonically as a function of time for a predetermined time interval, a cable extending through the borehole and connecting the downhole tool to the surface equipment, said synchronizing pulses being applied to said surface equipment via said cable, means connected to said cable to receive said synchronizing pulses and for initiating generation of said waveform responsive to each said synchronizing pulse, first and second acoustic energy receivers movably positioned in said borehole and spaced different fixed distances longitudinally of the borehole from each other and from said transmitter, first and second means respectively associated with the first and second receivers and responsive to the output of said generator and each acquiring and storing a signal level which is proportional to the instantaneous magnitude of said waveform at the time of arrival at its associated receiver of first acoustic energy from an acoustic pulse, means connecting the output of said generator to both of said first and second means, switch means including a first switch unit in the surface equipment and a second switch unit in the downhole tool for connecting said first and second receiver outputs in successive sequence to said first and second means, said first and second switch units having operating coils electrically connected via said cable, means responsive to the termination of each said waveform for actuating both units of said switch means, a common output circuit connected to said first and second means for developing a first signal proportional to the algebraic sum of the output signal levels of said first and second means and for developing a second signal proportional to one of said output signal levels, and means connected to the common output circuit for recording as a function of the depth of the downhole tool within the borehole said first and second signals to produce simultaneously two different curves one of which represents the travel time of pulses from said transmitter to said first receiver and the other of which represents the difference between the latter travel time and that of the pulses from the transmitter to the second receiver.

6. A system for measuring the acoustic velocity of earth formations adjacent a bore hole and simultaneously producing a pair of single receiver logs and a dual receiver log, said system comprising a transmitter movably positioned in the bore hole for producing and transmitting to the formations a train of acoustic energy impulses, first and second acoustic energy receivers disposed in fixed spaced relation to said transmitter in the same direction therefrom, means synchronized with said transmitter and responsive to signals from said receivers for generating first and second direct current voltages which are respectively proportional to the travel time of first received acoustic energy from said transmitter to said first receiver and to said second receiver, first and second cathode follower circuits, each of said circuits including an electron discharge device, having an anode, a cathode, and a control electrode, means for respectively supplying said first and second direct current voltages to the control electrodes of said discharge devices, a first large resistor and a first small resistor connected in series between said cathodes, a first recorder having input terminals connected across said first small resistor, a direct current voltage source having a pair of terminals, a second large resistor and a second small resistor connected between the cathode of said first cathode follower circuit and one terminal of said direct current voltage source, a third large resistor and a third small resistor connected between the cathode of said second cathode follower circuit and the other terminal of said direct current voltage source, and second and third recorders respectively connected across said second and third small resistors.

7. A system for measuring the acoustic velocity of earth formations adjacent a bore hole and producing simultaneous single and dual receiver logs which system comprises, first means including a transmitter movably positioned in the bore hole for producing and transmitting to the formations a train of acoustic energy impulses, first and second acoustic energy receivers disposed in fixed spaced relation to said transmitter in the same direction therefrom, second means synchronized with said transmitter and responsive to signals from said receivers for generating first and second direct current voltages which are respectively proportional to the travel time of acoustic energy from said transmitter means to said first receiver and to said second receiver, third means connected to the output of said second means for deriving from said first and second direct current voltages third and fourth direct current voltages respectively proportional to said first and second direct current voltages, fourth means connected to the output of said third means for subtracting said third and fourth voltages to derive a small difference voltage which is accurately proportional to the difference between said third and fourth voltages, a first recorder device, fifth means connected to the output of said fourth means for applying said difference voltage to the input of said first recorder device, sixth means responsive to said third voltage for deriving a second small voltage proportional to said third voltage, seventh means responsive to said fourth voltage for deriving a third small voltage proportional to said fourth voltage, and recording means connected to said fifth and sixth means to record said second and third small voltages.

8. A system for measuring the acoustic velocity of earth formations adjacent a bore hole and producing simultaneously a plurality of logs which system comprises, a transmitter movably positioned in the bore hole for producing and transmitting to the earth formations a train of acoustic energy impulses, first and second acoustic energy receivers disposed in fixed spaced relation to said transmitter in the same direction therefrom, means synchronized with said transmitter and responsive to signals from said receivers for generating first and second direct current voltages which are respectively proportional to the travel time of first received acoustic energy from said transmitter to said first receiver and to said second receiver, a pair of cathode follower circuits, each of said circuits including an electron discharge device having an anode, a cathode, and a control electrode, means for respectively supplying said first and second direct current voltages to the control electrodes of said discharge devices, a large resistor and a small resistor connected in series between said cathodes, a first recorder having input terminals connected across said small resistor, a direct current voltage source, a second large resistor and a second small resistor connected between one of said cathodes and said direct current voltage source, and a second recorder having input terminals connected across said second small resistor.

9. A system for measuring the acoustic velocity of earth formations adjacent a bore hole and producing simultaneous single and dual receiver logs which system comprises, a transmitter movably positioned in the bore hole for producing and transmitting to the formations a train of acoustic energy impulses, first and second acoustic energy receivers disposed in fixed spaced relation to said transmitter in the same direction therefrom, means synchronized with said transmitter and responsive to signals from said receivers for generating first and second direct current voltages which are respectively proportional to the travel time of first received acoustic energy from said transmitter to said first receiver and to said second receiver, a plurality of cathode follower circuits, each of said circuits including an electron discharge device having an anode, a cathode, and a control electrode, means for respectively supplying said first and second direct current voltages to the control electrodes of said discharge devices, a first large resistor and a first small resistor connected in series between pairs of said cathodes, a first recorder means having input terminals connected across said first small resistor, a direct current voltage source, a second large resistor and a second small resistor connected between one of said cathodes and said direct current voltage source, a third large resistor and a third small resistor connected between another of said cathodes and said direct current voltage source, and second and third recorder means having input terminals respectively connected across said second and third small resistors.

10. A system for measuring the acoustic velocity of earth formations adjacent a bore hole and producing simultaneous single and dual receiver logs which system comprises, a transmitter movably positioned in the bore hole for producing and transmitting to the formations a train of acoustic energy impulses, a pair of acoustic energy receivers disposed in fixed spaced relation to said transmitter in the same direction therefrom, means synchronized with said transmitter and responsive to signals from said receivers for generating first and second direct current voltages which are respectively proportional to the travel time of first received acoustic energy from said transmitter means to said first receiver and said second receiver, a pair of control circuits, each of said circuits including an electron discharge device having an output electrode and a control electrode, means for respectively supplying said first and second direct current voltages to the control electrodes of said discharge devices, a first large impedance and a first small impedance connected in series between said output electrodes, a source of calibrating voltage, a first recorder device having input terminals connected across said first small impedance, a second large impedance and a second small impedance connected between one of said output electrodes and said source, a third large impedance and a third small impedance connected between the other of said output electrodes and said source, and second and third recorder devices having input terminals respectively connected across said second and third small impedances.

11. A system for measuring the acoustic velocity of earth formations adjacent a bore hole and producing simultaneous single and dual receiver logs which system comprises, an acoustic pulse transmitter movably positioned in said bore hole for generating and transmitting to said formations a train of acoustic pulses and for concurrently generating a train of synchronizing pulses, a generator for producing a waveform that increases linearly as a function of time for a predetermined time interval, means in circuit with said transmitter for initiating generation of said waveform responsive to each said synchronizing pulse, a plurality of acoustic energy receivers movably positioned in said bore hole in different fixed spaced relations relative to said transmitter in the same direction therefrom, a switch unit corresponding to each said receiver, each said switch unit including means responsive to the output of said generator for acquiring and storing an electric signal which is proportional to the instantaneous magnitude of said waveform at the time of arrival of first acoustic energy at the corresponding receiver for each transmitted acoustic pulse received by that receiver, means connecting the output of said generator to each said switch unit, a plurality of means each responsive to arrival of first acoustic energy at one of said receivers for controlling the corresponding switch unit to change its electric signal upon change in the instantaneous magnitude of said waveform applied thereto upon arrival of first acoustic energy at that receiver, switch means connecting said receiver outputs in successive sequence to said control means, means responsive to termination of each said waveform for actuating said switch means, a plurality of control circuits, each circuit including an electron discharge device having an output electrode and a control electrode, means connected to the output of said switch units for applying the different electric signals to respective control electrodes of said discharge devices, a first large impedance and a first small impedance connected in series between respective pairs of said output electrodes, recorder means having input terminals connected across said first small impedance, a voltage calibration source, a second large impedance and a second small impedance connected between one of said output electrodes and said voltage calibration source, a third large impedance and a third small impedance connected between said calibration source and another of said output electrodes, and second and third recorder means respectively connected across said second and third small impedances.

References Cited in the file of this patent

UNITED STATES PATENTS

| | | |
|---|---|---|
| Re. 24,446 | Summers | Mar. 25, 1958 |
| 2,722,282 | McDonald | Nov. 1, 1955 |
| 2,737,639 | Summers et al. | Mar. 6, 1956 |
| 2,779,912 | Waters | Jan. 29, 1957 |
| 2,813,590 | McDonald | Nov. 19, 1957 |
| 2,931,455 | Loofbourrow | Apr. 5, 1960 |